US005667669A

United States Patent [19]

Hart

[11] Patent Number: 5,667,669
[45] Date of Patent: Sep. 16, 1997

[54] METHODS FOR INHIBITING FOAM

[75] Inventor: Paul R. Hart, The Woodlands, Tex.

[73] Assignee: BetzDearborn Inc., Trevose, Pa.

[21] Appl. No.: 620,647

[22] Filed: Mar. 22, 1996

[51] Int. Cl.$^6$ .................................................. C10G 9/14
[52] U.S. Cl. .......................... 208/131; 208/30; 201/4; 203/20
[58] Field of Search ................ 208/131; 201/9; 203/20

[56] References Cited

U.S. PATENT DOCUMENTS

| | | | |
|---|---|---|---|
| 2,702,793 | 2/1955 | Smith | 252/78 |
| 2,862,885 | 12/1958 | Nelson et al. | 252/49.6 |
| 3,657,136 | 4/1972 | Lieberman et al. | 252/321 |
| 3,700,587 | 10/1972 | Hyde | 208/131 |
| 3,756,918 | 9/1973 | Heilweil et al. | 195/28 R |
| 4,003,839 | 1/1977 | Van Hesden | 252/25 |
| 4,005,044 | 1/1977 | Raleigh | 252/358 |
| 4,082,690 | 4/1978 | Farminer | 252/321 |
| 4,176,047 | 11/1979 | Orrell et al. | 208/131 |
| 4,329,528 | 5/1982 | Evans | 585/3 |
| 4,961,840 | 10/1990 | Goyal | 208/131 |
| 5,169,560 | 12/1992 | Hart | 252/321 |
| 5,296,132 | 3/1994 | Hart | 208/131 |
| 5,389,299 | 2/1995 | Hart | 252/321 |
| 5,472,637 | 12/1995 | Hart | 252/358 |

*Primary Examiner*—Helane Myers
*Attorney, Agent, or Firm*—Alexander D. Ricci; Philip H. Von Neida

[57] ABSTRACT

Methods for inhibiting the carryover of foam in a delayed coker unit processing hydrocarbon liquids are disclosed. A non-silicone defoamer compound is added to the hydrocarbon until the foam height surpasses a predetermined value. A silicone defoamer compound is then added to the hydrocarbon to knock down the foam head and inhibit carryover of the foam.

6 Claims, No Drawings

METHODS FOR INHIBITING FOAM

FIELD OF THE INVENTION

The present invention relates to methods for inhibiting the carryover of foam in a delayed coking unit processing a hydrocarbon liquid.

BACKGROUND OF THE INVENTION

Foaming problems can occur during the high temperature processing of hydrocarbon fluids. Crude oil towers and cokers operating at high temperatures can produce foam in their hydrocarbon products which in turn diminishes the efficiency of the tower or coker, degrading the quality of the overhead products such as gasoline and gas oils. Severe foaming problems are often encountered in crude oils during separation of dissolved gases at the well head.

In the processing of various residual petroleum stocks into coke, a commonly used technique is the well known delayed coking process. In the delayed coking process, heavy residual oils are heated to about 500° C. by pumping them at high velocity through a pipe furnace and then charging these oils to an insulated coking drum. The delayed coking process produces a quantity of foam which is undesirable since it diminishes the efficient operation of the process.

Other refinery processes that can experience foaming problems include crude oil distillation, vis breaking, and solvent or super critical fluid deasphalting units. Traditionally, silicone (dimethyl polysiloxane) defoamer compounds were employed to treat these operations for foaming problems.

The use of silicone defoamer compounds is economically attractive due to the need of low dosage levels in the hydrocarbons. However, they are expensive with respect to using them in less expensive, lower quality hydrocarbon fluids. Silicone defoamer compounds also pose a problem due to their difficulty in dispersing in high temperature hydrocarbon systems. The silicone compounds also tend to react with the metal surfaces of the processing system. In particular, they poison the catalyst used for hydrotreating crude oil fractions.

Similarly, problems occur when non-silicone defoamer compounds are employed as they can only knock down the foam head in a delayed coker unit to a certain extent and do not completely collapse the foam head.

DESCRIPTION OF THE RELATED ART

U.S. Pat. No. 2,702,793 teaches the use of a blend of 100,000 cSt dimethylsilicone and amyltriethoxysilane to inhibit foaming in hydrocarbon oils.

U.S. Pat. No. 2,862,885 teaches a hydrocarbon oil which contains a homopolymer of a monovinylalkoxysilane to inhibit foaming of the hydrocarbon oil.

DETAILED DESCRIPTION OF THE INVENTION

The present invention relates to methods for inhibiting the carryover of foam in a delayed coker unit processing a hydrocarbon liquid comprising the steps of:

Adding an effective defoaming amount of a non-silicone defoamer compound to said hydrocarbon liquid;

Measuring the height of said foam in said delayed coker unit;

Comparing said height to a predetermined value;

Adding an effective defoaming amount of a silicone defoamer compound to said hydrocarbon liquid when said height is greater than said predetermined value.

It has been surprisingly found that when a non-silicone defoamer compound is employed, the foam is suppressed but the foam head is not completely collapsed. When the foam head reaches an established height in the delayed coker unit, a silicone defoamer can be added to the foam to slowly collapse the foam head as the hydrocarbon liquid level rises. This stops the foam head from rising above the height of the coker drum, while minimizing silicone defoamer addition and thus carryover of silicon downstream.

The hydrocarbon liquid can be any that is processed in a delayed coker unit. Representative hydrocarbons include but are not limited to atmospheric residues, reduced crudes, cracked tars and heavy catalytic cycle oils.

The non-silicone defoamer compound can be any defoamer compound that does not contain silicone. Representative examples are organic sulfonates, carbon powders, vegetable oils, animal oils, polyisobutylene compounds and blends thereof as disclosed in U.S. Pat. Nos. 5,169,560; 5,296,132; 5,389,299; and 5,472,637; the contents of which are wholly incorporated by reference herein. These compounds are given by way of example and should not be construed as limiting the non-silicone defoamer compounds that can be used in this invention.

The silicone defoamers that can be used in the present invention generally have from about 12,500 to about 500,000 cSt viscosity. These compounds include but are not limited to silicone such as L45 DMPS 10,000 cSt and L-45 DMPS 60,000 cSt available from Union Carbide Corp.

Actual dosage ranges for both the non-silicone defoamer compounds and the silicone defoamer compounds depend upon the variables in a delayed coking process. These variables can include type of hydrocarbon, temperature, amount of impurities in the hydrocarbon, and amount of foam. For purposes of the present invention, the term "an effective amount" of defoamer is that amount which will suppress foam. The effective amount will range from about 2 parts to about 10,000 parts of non-silicone defoamer per million parts of hydrocarbon and from about 1 part to about 5,000 parts of silicone defoamer per million parts of hydrocarbon.

The predetermined value represents an established foam height which the operator of the delayed coking unit does not want to exceed. This is an arbitrary value that is determined by the operator but will typically be a height which places the foam height within a short distance of the top of the delayed coker unit.

The height of the foam is typically determined by measuring the density of the liquid at a series of fixed heights by detecting the attenuation of ionizing gamma radiation emanating from an emitter on the opposite wall. The detector transmits the information through electronic means to the operator.

The following examples are intended to demonstrate the present invention and should not be construed as limiting the scope thereof.

EXAMPLES

Testing was performed on a delayed coker unit at a Western refinery. The defoamer feed line was purged with the non-silicone defoamer for 30 minutes at 100% pump capacity. Defoamer was fed at 100% capacity throughout the trial. The flow of cutter (used to dilute the thicker silicone in the line) was cut off because of the high feed rates of defoamer. The results of this trial are reported in Table I.

TABLE I

Western Refinery Delayed Coker Unit

| Time (hr:min) | Coker Feed Rate (PR*) | Non-Silicone[1] Defoamer Feed Rate (GPH) | DMPS Defoamer Feed Rate (GPH) | Mid Level Density Detection (%) | Top Level Density Detection (%) |
| --- | --- | --- | --- | --- | --- |
| 9:45 | 7.0 | 0 | 0 | 40 | 6 |
| 9:55 | 7.0 | 0 | 0 | 50 | 6 |
| 10:00 | 6.0 | 0 | 0 | 45 | 6 |
| 10:10 | 6.0 | 0 | 0 | 50 | 6 |
| 10:40 | 6.0 | 106 | 0 | 40 | 6 |
| 11:50 | 6.0 | 106 | 0 | 45 | 6 |
| 11:55 | 7.3 | 106 | 0 | 45 | 6 |
| 12:10 | 7.9 | 106 | 0 | 70 | 6 |
| 12:30 | 7.9 | 106 | 0 | 80 | 6 |
| 12:35 | 7.5 | 106 | 2 | 50 | 6 |
| 12:40 | 7.5 | 0 | 2 | 100 | 37 |
| 12:45 | 7.5 | 0 | 10 | 100 | 82 |
| 12:50 | 7.5 | 0 | 10 | 50 | 6 |

PR* = Pen reading
[1]=Petroleum sodium sulfonate, available as Petronate L from Witco, 25% in hydrocarbon solvent.

The coker feed rate varied throughout the run. Normally, it is fed at a PR of 7.0, but upstream problems limited to 6.0 for a while, then it was turned up to 7.9, then 7.5, to make up the loss. This increased the amount of foam toward the end of the run.

The non-silicone defoamer knocked the foam down from the 50% to the baseline 40% middle density detection level and kept it down for 1.5 hours, when the coker feed rate was increased. At that point, the foam rose up to the 80% level on the middle density detector. This was when silicone was fed at 2 "inches" on the display (about 2 GPH) and the foam front fell to the then current baseline of 50%.

Both defoamers (silicone and non-silicone) were then being fed. When the non-silicone pump was turned off, the foam shot rapidly to 100% on the mid level density detector and as high as 82% on the top level detector. The silicone defoamer was increased to the maximum (about 10 GPH) as soon as the foam began rising and the foam collapsed to the baseline in about 5 minutes.

Further testing was performed on a delayed coker unit at a Southwestern refinery. The non-silicone defoamer tested was 2300 average molecular weight polyisobutylene, available from Amoco as Indopol H-1900, 25% in hydrocarbon solvent. The silicone defoamer tested was dimethylpolysiloxane having a viscosity of 60,000 centistoke. The results and observations gathered from this testing are presented in Table II.

TABLE II

Southwestern Refinery Delayed Coker Unit

| Run No. | Non-Silicone Defoamer Feed Rate (gal/drum) | Silicone Defoamer Feed Rate (gal/drum) |
| --- | --- | --- |
| 1 | 177 | 52 |

The non-silicone defoamer could not completely knock down the foam at either the 40 foot or 30 foot (from top) density detectors with feedrates of 60 gallons per hour (GPH) non-silicone antifoam. The defoamer feed was switched to silicone 1¾ hours before drum switch. The foam cleared from the 20 foot (from top) density detector level in 20 minutes.

| Run No. | Non-Silicone Defoamer Feed Rate (gal/drum) | Silicone Defoamer Feed Rate (gal/drum) |
| --- | --- | --- |
| 2 | 122 | 15 |

The non-silicone defoamer completely knocked foam down twice from 40 foot level and once from 30 foot level Foam reached 20 foot level approximately 2½ hours before switch. The foam was completely knocked down twice by raising the defoamer rate. Then foam came back up again 2 hours before the drum switch. The defoamer feed was switched back to silicone 30 minutes before the switch and it knocked the foam down below the 20 foot level.

| Run No. | Non-Silicone Defoamer Feed Rate (gal/drum) | Silicone Defoamer Feed Rate (gal/drum) |
| --- | --- | --- |
| 3 | — | 96 |

The solid/liquid level reached the 40 foot level 5 hours before the switch and the solid/liquid level reached the 30 foot level 2 hours before the drum switch.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for inhibiting the carryover of foam in a delayed coker unit processing a hydrocarbon liquid comprising the steps of:

adding an effective defoaming amount of a non-silicone defoamer compound to said hydrocarbon liquid;

measuring the height of said foam in said delayed coker unit;

comparing said height to a predetermined value wherein said predetermined value represents a height that said foam should not exceed;

when said height is greater than said predetermined value, stopping the addition of said non-silicone defoamer and adding an effective defoaming amount of a silicone defoamer compound to said hydrocarbon liquid.

2. The method as claimed in claim 1 wherein said non-silicone defoamer compound is selected from the group consisting essentially of organic sulfonate compounds, carbon powder, vegetable oils, animal oils, polyisobutylene compounds, and mixtures thereof.

3. The method as claimed in claim 1 wherein said silicone defoamer compound has a viscosity of about 12,500 to about 500,000 cSt.

4. The method as claimed in claim 1 wherein said hydrocarbon liquid is selected from the group consisting essentially of crude oil, atmospheric or vacuum distillation tower residues, and fluid catalytic or hydrocarbon cycle oils or residues.

5. The method as claimed in claim 1 wherein said non-silicone defoamer compound is added to said hydrocarbon liquid in an amount ranging from about 2 parts to about 10,000 parts per million parts of hydrocarbon.

6. The method as claimed in claim 1 wherein said silicone defoamer compound is added to said hydrocarbon liquid in an amount ranging from about 2 parts to about 5,000 parts per million parts of hydrocarbon.

* * * * *